(12) United States Patent
Blau et al.

(10) Patent No.: US 12,244,461 B2
(45) Date of Patent: Mar. 4, 2025

(54) METHOD AND NODE FOR USING TEMPLATES

(71) Applicant: TELEFONAKTIEBOLAGET LM ERICSSON (PUBL), Stockholm (SE)

(72) Inventors: Staffan Blau, Spånga (SE); Magnus Björkqvist, Gothenburg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 82 days.

(21) Appl. No.: 17/606,706

(22) PCT Filed: May 7, 2020

(86) PCT No.: PCT/SE2020/050470
§ 371 (c)(1),
(2) Date: Oct. 26, 2021

(87) PCT Pub. No.: WO2020/226563
PCT Pub. Date: Nov. 12, 2020

(65) Prior Publication Data
US 2022/0217045 A1    Jul. 7, 2022

Related U.S. Application Data (60) Provisional application No. 62/844,294, filed on May 7, 2019.

(51) Int. Cl.
*H04L 41/084* (2022.01)
*G06F 9/50* (2006.01)

(52) U.S. Cl.
CPC ........ *H04L 41/0843* (2013.01); *G06F 9/5077* (2013.01)

(58) Field of Classification Search
CPC .................. H04L 41/0843; G06F 9/5077
See application file for complete search history.

(56) References Cited

U.S. PATENT DOCUMENTS

2018/0145889 A1* 5/2018 Xu .................. G06F 9/4856
2018/0316559 A1* 11/2018 Thulasi ................ H04L 41/40

FOREIGN PATENT DOCUMENTS

| CN | 107800556 A | 3/2018 |
| CN | 109565446 A | 4/2019 |

(Continued)

OTHER PUBLICATIONS

ETSI GS NFV-IFA 007 v3.1.6, Network Functions Virtualisation (NFV) Release 3; Management and Orchestration; Or-Vnfm reference point—Interface and Information Model Specification (Year: 2019).*

(Continued)

*Primary Examiner* — Suraj M Joshi
(74) *Attorney, Agent, or Firm* — COATS & BENNETT, PLLC (57) ABSTRACT

Embodiments herein relate to e.g. a method performed by a node for handling a management operation. The node receives from an orchestration node, a request for an operation related to virtual network function operation. The node maps a first parameter associated with the request to a second parameter related to a cloud native template; and invokes an orchestration command comprising the mapped second parameter related to the cloud native template.

23 Claims, 10 Drawing Sheets

(56) References Cited

FOREIGN PATENT DOCUMENTS

| | | |
|---|---|---|
| RU | 2641477 C1 | 1/2018 |
| RU | 2646336 C1 | 3/2018 |

OTHER PUBLICATIONS

Ericsson, "SOL14: A Hybrid Approach Using Tosca and Hot Discussion Paper", ETSI, 2012.

ETSI, "Network Functions Virtualisation (NFV) Release 2; Management and Orchestration; Or-Vnfm reference point—Interface and Information Model Specification", ETSI GS NFV-IFA 007 V2.4.1, Feb. 2018.

ETSI, "Network Functions Virtualisation (NFV) Release 3; Management and Orchestration; Or-Vnfm reference point—Interface and Information Model Specification", ETSI GS NFV-IFA 007 V3.1.6, Feb. 2019.

ETSI, "Network Functions Virtualisation (NFV) Release 3; Management and Orchestration; Functional requirements specification", ETSI GS NFV-IFA 010 V3.2.1, Apr. 2019.

Nokia, "CloudBand Application Manager, CBAM 17.5 SP1 (v17.5.1), v.1", Template Developer Guide, Issue 1-3, 2017.

\* cited by examiner

| Heat parameter | Parameter in Or-Vnfm |
|---|---|
| Oam_service_ip | = instantiateVnfRequest.additionalParams.oam_service_ip |
| Gpb_flavor | = grant.vimAssets.computeResourceFlavours<br>(vnfdVirtualComputeDescId = 'GPB').vimFlavorId |

METHOD AND NODE FOR USING TEMPLATES

PRIORITY CLAIM

This application is a national stage application of International Patent Application No. PCT/SE2020/050470, filed May 7, 2020, which claims priority to U.S. Patent Application No. 62/844,294, filed May 7, 2019, the disclosure disclosures of which are hereby incorporated in their entirety by reference.

TECHNICAL FIELD

Embodiments herein relate to a node, and a method performed therein for communication. In particular, embodiments herein relate to handling Network Function Virtualization.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In the European Telecommunications Standards Institute (ETSI) Network Functions Virtualization (NFV)—Management and Orchestration (MANO) architecture (see FIG. 1) for orchestration and life-cycle management of virtualized networks and Virtualized Network Functions (VNF), the VNF Manager (VNFM) entity handles the interaction with the native Virtualization Infrastructure Manager (VIM) in the cloud on which one deploys VNF applications.

Figure 1:
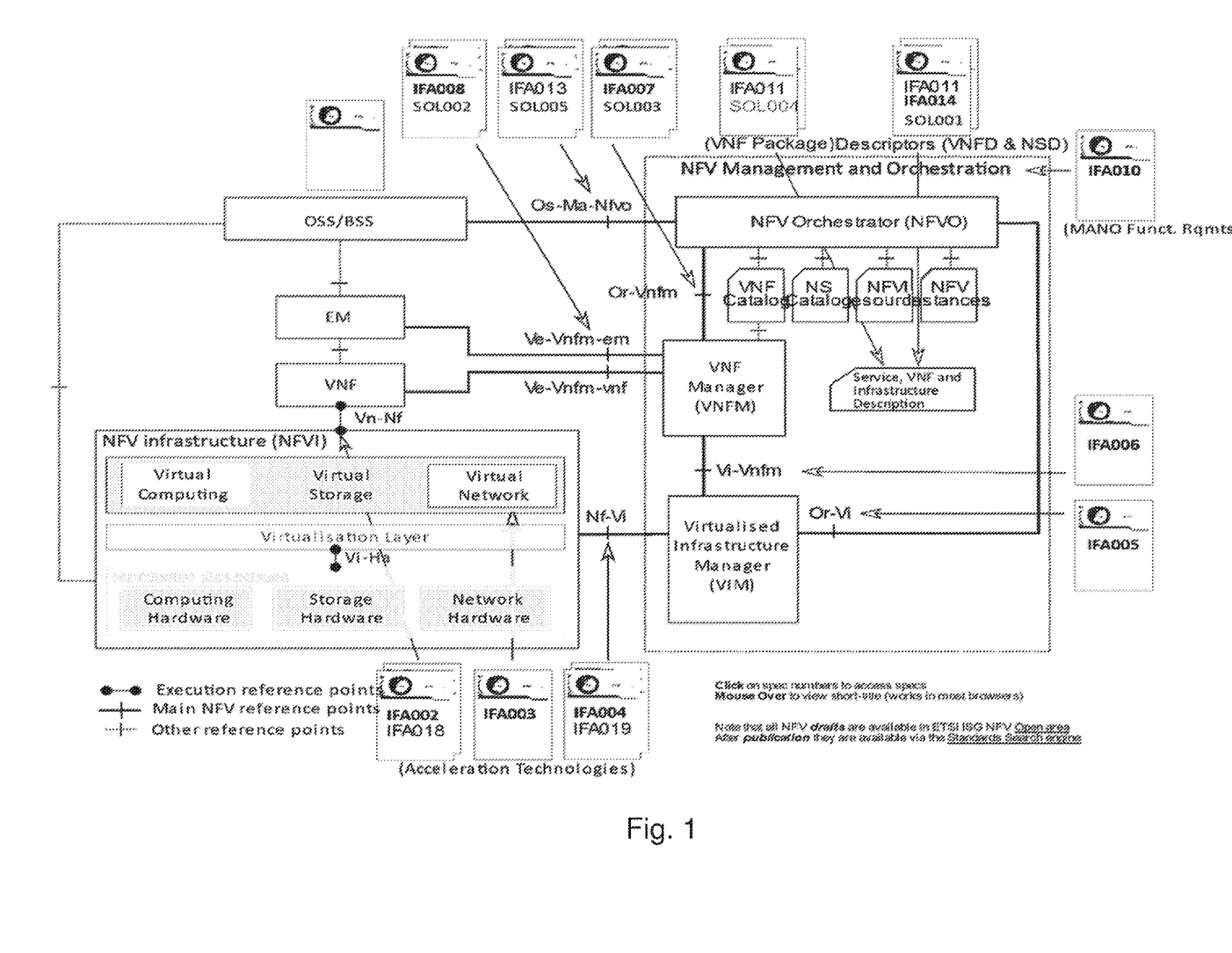
FIG. 1 shows the NFV-MANO architectural components according to prior art.

FIG. 1 shows the NFV-MANO architectural components and what ETSI specifications that relates to the different components and interfaces.

The VNFM shall base the interactions with the VIM on a combination of:
a) information in the VNF Descriptor (VNFD), which is in the form of a Topology and Orchestration Specification for Cloud Applications (TOSCA) Service Template that is delivered together with the software for the VNF, and
b) deployment specific information, e.g. IP addresses, network identifiers, etc., provided by NFV Orchestrator (NFV-O) on a per deployment and per IFA007/SOL003 defined lifecycle-management operation, e.g. instantiate, scale, health check, terminate, etc., via the Or-Vnfm reference point, to the VNFM.

In more detail, the VNFD describes the VNF supported lifecycle-management operations requirements on networking environment, type of resources to be orchestrated as part of a VNF instance, deployment options with regards to resources, etc., while the instance specific information details this with instance specific data. An Application Programming Interface (API) between NFV-O and VNFM is specified in "ETSI GS NFV-SOL003" and referred to as Or-Vnfm.

While the SOL003 specifies the VNF related management operations needed to be supported by the VNFM, IFA010 complements this with functional requirements for the VNFM.

One can from these specs derive some basic behavioral requirements that a VNFM shall fulfill when receiving a VNF lifecycle management request like "instantiate VNF of a particular type", scale an existing VNF instance, etc.:
1. Request NFVO to grant resource updates
   If the VNFM received request for creating a new VNF instance, or adding, changing or removing a virtual resource from an existing VNF instance, then the VNFM shall use the VNFD and the deployment flavor and instantiation level information in the request to calculate the resource changes it will do, and send a Grant request to NFVO listing this.
2. Request the VIM to perform the requested management task
   If grant is successful, or no grant was needed, and the request is for some changes to a VNF virtualization infrastructure like a new VM image, then the VNFM shall generate the interactions towards the VIM to perform the requested task.
3. Notifying NFVO of resource information for a VNF
   If the request type so specifies then interrogate the VIM on what resources are in existence for the VNF instance, and send this information to the NFVO, using the resource ID's defined in the VNFD to identify the different resource types.

However, the NFV-MANO standard does not specify how the VNFM can use the VNFD and the dynamically provided instance and lifecycle-management specific information, to in step 2 derive the operations requests and arguments towards the VIM API of clouds like Openstack, Virtual Machine (VM)-ware cloud, or a Kubernetes cluster. Nor does the NVF-MANO standard describe how to query the VIM for resource information and map this to notifications that contains resource identifies that can be understood by the NFVO.

SUMMARY

There are at least two approaches currently used, by different VNFM implementations, for solving the above problem:
a. The VNFM contains a TOSCA orchestrator and orchestration plugin scripts, generic or provided with the VNF software, referred to in the lifecycle management operations declarations of the TOSCA service template, with the plugins translating the information in the TOSCA declarative VNF description and the deployment specific data from the VNFO, to the cloud native management and orchestration API operations. In this case the orchestration plugins contain the knowledge on how to translate information specified in the VNFD VNF specific and the TOSCA template does not contain all needed details. The orchestrator plugins method is the approach for example used by the Cloudify Orchestrator. However, there are no standards on how the plugins shall be implemented and what they do so the solution is specific for the Cloudify Orchestrator and a VNFD must be designed accordingly.

b. The VNFM use Cloud native templates, e.g. heat templates for openstack, Helm templates for Kubernetes, etc., as provided in the VNF software package, in the interaction with the VIM, and only require the TOSCA service template to specify the different lifecycle management operations and basic resource information needed for the grant procedure. The cloud native templates are provided as artifacts in the VNF software package, together with some information needed by the VNFM to be able to map information, coming from NFVO in a lifecycle management operation, to the input parameters defined in the cloud native templates, as well as information on how to map the native resource identifiers to the ones used in the VNFD, e.g. needed for some of the messages sent from VNFM to NFVO.

The first approach, however, has some drawbacks:

Lack of maturity of the ETSI NFV specification SOL001 for TOSCA specified VNF Descriptor (VNFD):
  with regards to covering all infrastructure orchestration features for different clouds; and
  with regards to unambiguously describing how to translate a TOSCA based VNFD to operations on the virtualization infrastructure manager (VIM)—leading to unpredictably deployment results when using different orchestrators.

Poor tool echo system for development, test and verification using only a TOSCA VNFD for orchestration and lifecycle management.

It will be difficult for the ETSI SOL001 and Organization for the Advancement of Structured Information Standards (OASIS) TOSCA specifications, as well as the TOSCA ecosystem, development and management tools, to keep up with the feature velocity of cloud features and cloud native orchestration tools.

The second approach has its merits, however, the methods there used for how parameter and resource translations are done impacts the VNFD as well as the cloud native templates e.g. Heat templates, Openstack Heat templates, or Kubernetes Helm templates:

It is in this solution not possible to use cloud native templates not designed explicitly to be used in a MANO context. The cloud native templates, also referred to as Cloud Native orchestration templates or just native orchestration templates, need to include knowledge on how the instance and lifecycle management specific information is delivered over Or-Vnfm.

The TOSCA service template needs to include information, to be used only by the known application manager, regarding the mapping between e.g. cloud native resources such as Openstack native resources and the TOSCA described resources.

There are basically two translation issues needed to be handled when using e.g. a TOSCA VNFD together with cloud native templates:

How to map information received by VNFM, over the Or-Vnfm interface from NFVO, to values for input parameters in the Cloud Native templates, e.g. inputs defined in the Openstack Heat templates, Kubernetes Helm templates, etc.

How to, on information requests from NFVO or in information notifications, map the resources created in the cloud to resource information that describes the deployed VNF instance in terms of the resource type ID's used in the TOSCA VNFD, which are the resource ID's the NFVO understands.

An object of embodiments herein is to provide NFV in an efficient manner.

The object may be achieved according to an aspect by providing a method performed by a node for handling a management operation. The node receives from an orchestration node, a request for an operation related to virtual network function operation. The node maps a first parameter associated with the request to a second parameter related to a cloud native template; and invokes an orchestration command comprising the mapped second parameter related to the cloud native template.

The object may be achieved according to another aspect by providing a node for handling a management operation. The node is adapted to receive from an orchestration node, a request for an operation related to virtual network function operation. The node is further adapted to map a first parameter associated with the request to a second parameter related to a cloud native template; and to invoke an orchestration command comprising the mapped second parameter related to the cloud native template.

Embodiments herein provide an efficient way of handling NFV by mapping the first parameter associated with the request to the second parameter related to a cloud native template e.g. without a need to signal any information on how to translate resource id's from native id's to TOSCA id's.

BRIEF DESCRIPTION OF THE DRAWINGS

Embodiments will now be described in more detail in relation to the enclosed drawings, in which.

DETAILED DESCRIPTION

Figure 2A:
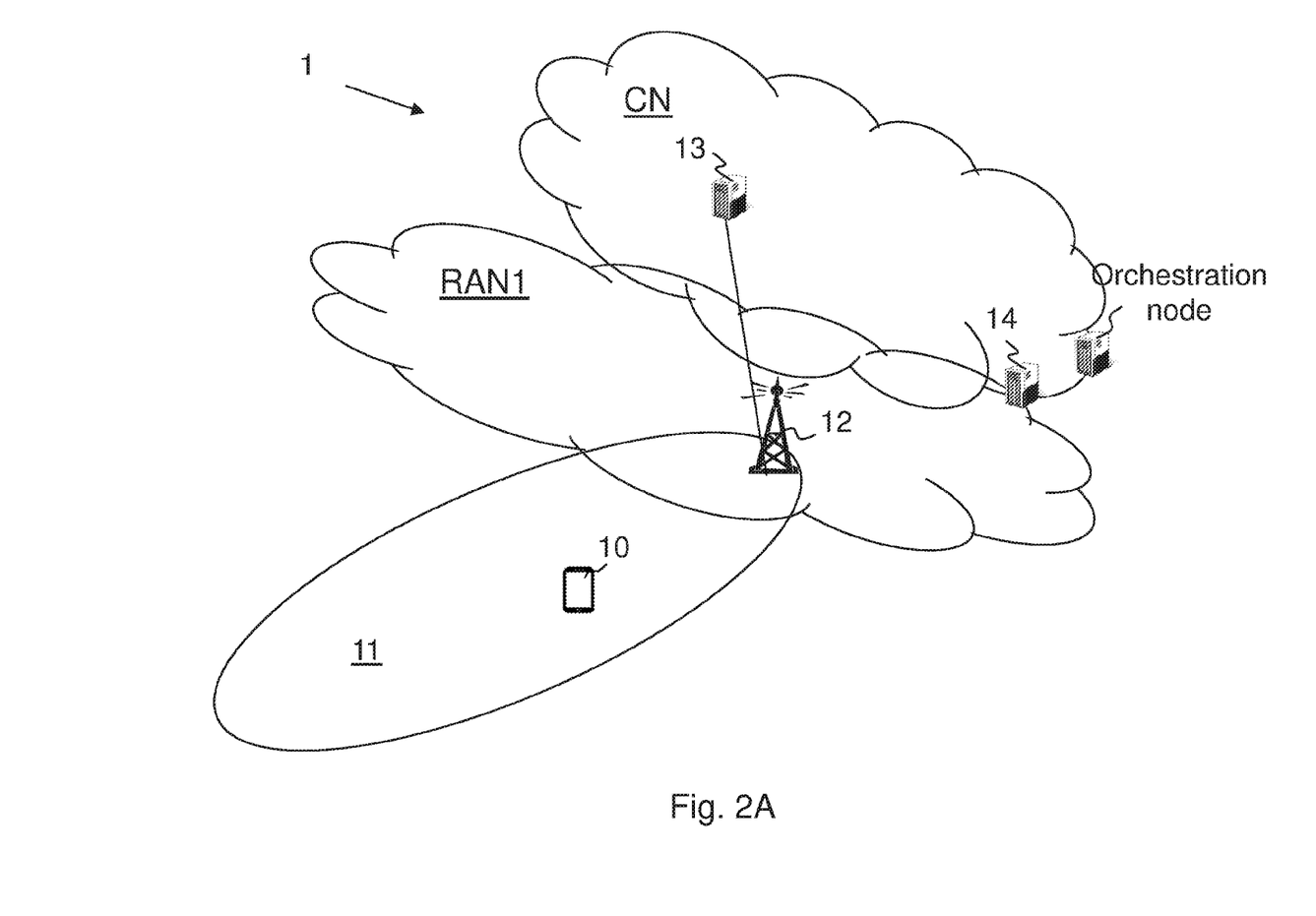
FIG. 2A is a schematic overview depicting a communication network implementing embodiments herein.

Embodiments herein relate to communication networks in general. FIG. 2A is a schematic overview depicting an exemplary of a communication network 1. The communication network 1 comprises e.g. one or more access networks, such as radio access networks (RAN) e.g. a first RAN (RAN1), connected to one or more core networks (CN). However, embodiments herein may be implemented in any communication network such as in a mobile core, in service networks such as IP multimedia subsystem (IMS), in a user data management network, etc. The communication network 1 may use a number of different technologies, such as packet switching, Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, user equipments (UE) e.g. a UE 10 such as a mobile station, a non-access point (non-AP) station (STA), a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device, Internet of Things (IoT) operable device, Device to Device (D2D) terminal, mobile device e.g. smart phone, laptop, mobile phone, sensor, relay, mobile tablets or any device communicating within a cell or service area.

The exemplary communication network 1 may comprise a radio network node 12 providing radio coverage over a geographical area, a service area 11 or a cell, of a first radio access technology (RAT), such as New Radio (NR), LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a UE within the service area served by the radio network node 12 depending e.g. on the first radio access technology and terminology used.

The communication network 1 further comprises a network node 13 such as a RAN node and/or a core network node e.g. Radio Software Defined Networking (SDN) node, an Access and Mobility Management Function (AMF) node, an mobility management entity (MME), a serving gateway (S-GW), a Serving GPRS Support Nodes (SGSN) node, or corresponding node in e.g. a 5G network or similar. The GPRS meaning General Packet Radio Services.

Embodiments herein relate to VNFs and the implementation of a NFV-MANO architecture for virtualization of using network resources of the RAN, IP multimedia subsystem (IMS) and/or the CN, e.g. resources of the radio network node 12 and the network node 13. Embodiments herein relate to a node 15 such as a management node e.g. a VNFM or a node comprising an orchestration node such as a NFVO and a VNFM.

As stated above there are basically two translation issues needed to be handled when using e.g. a TOSCA VNFD together with cloud native templates:
  How to map information received by VNFM, over the Or-Vnfm interface from NFVO, to values for input parameters in the Cloud Native templates, e.g. inputs defined in the Openstack Heat templates, Kubernetes Helm templates, etc.
  How to on information requests from NFVO, or in information notifications, map the resources created in the cloud to resource information that describes the deployed VNF instance in terms of the resource type id's used in the TOSCA VNFD, which are the resource ID's the NFVO understands.

The approach described in this disclosure solves the first issue by in e.g. the software delivery package, e.g., the ETSI NFV specified VNF Package, including, in addition to the Cloud Native templates also a script or mapping table that handles the parameter mappings for all different management operations requested from the orchestration node such as the NFVO. The script uses as input only information from the preceding interactions between NFVO and VNFM, e.g. from the operation request and when granting is part of the interactions then also information from the grant response is needed.

The second issue is handled by using a name correlation scheme, seeing to that the resource names in the TOSCA VNFD are derived from the corresponding resource names in the Cloud Native templates.

The response to a query from VNFM to the VIM on the created cloud native resources for a VNF instance, can then be auto translated to a list of resources where the resource id's are the ones that the NFVO can understand. As an option also a script provided in a VNF package could be used also for this, but in many cases the translation can be done through a generic procedure that only uses info from the VIM and from the VNFD.

Thus, according to some aspects there are provided herein a method and a node for handling a lifecycle management request for a VNF.

General advantage(s) of using cloud native templates together with the TOSCA VNFD may be provided by certain aspects of the present disclosure and their embodiments:
  Decoupling
  (Re)use the cloud native template technology where its strength lies—in the interaction with the VIM and the unambiguous, detailed orchestration and management of the cloud's native virtual resources.
  Use TOSCA descriptor for where its strength lies—specifying lifecycle management operations, deployment flavors, instantiation level, the resource modelling aspects needed for granting, etc. A deployment flavor references the VDUs and VNF components (VNFC) that are actually deployed
  Known orchestration result
  Predictable VNF deployment with exact wanted result.
  No interoperation issues due to vendor implementation specific TOSCA VNFD to VIM translation.
  SOL001 lack of maturity
  Missing features for OpenStack and VMware VIMs, and completely lacking model for deployment on Kubernetes—huge effort to define in TOSCA.
  Keeping up with cloud native feature velocity. SOL001 based TOSCA VNFD will always be behind what the cloud native templates and API supports.
  Simplified VNFM implementation
  Interaction with VIM using cloud's native application orchestration capabilities.
  Simplified development and verification of orchestration
  Using cloud native checkers, Continuous Integration/Continuous Delivery (CI/CD) frameworks, debug tools, test tools, etc.

Additionally, certain aspects of the present disclosure and their embodiments may provide one or more of the following technical advantage(s):
  The VNFD conforms in full to the ETSI SOL001 specification, and need not contain any information on how to translate resource id's from native id's to TOSCA id's.
  The resource id translations can in many cases be automated without the VNF designer having to write how to do the translations.

The cloud native templates need not include any MANO specific information, which makes it possible to easily use them in both MANO context and Non-MANO orchestration contexts. Even using existing VIM-native templates today used in non-ETSI management environments is possible.

Both the TOSCA VNFD and the Cloud native templates become easier to read by a human than if the translation information is included in the VNFD and cloud native templates.

Some embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The proposed technology provides a method for how the node such as a VNFM, in an ETSI NFV standards compliant way, may use Cloud Native templates, as a complement to the TOSCA VNFD, while not requiring any solution specific enhancements to the TOSCA VNFD nor to the Cloud Native templates used on non-MANO contexts for orchestrating the VNF.

Figure 2B:
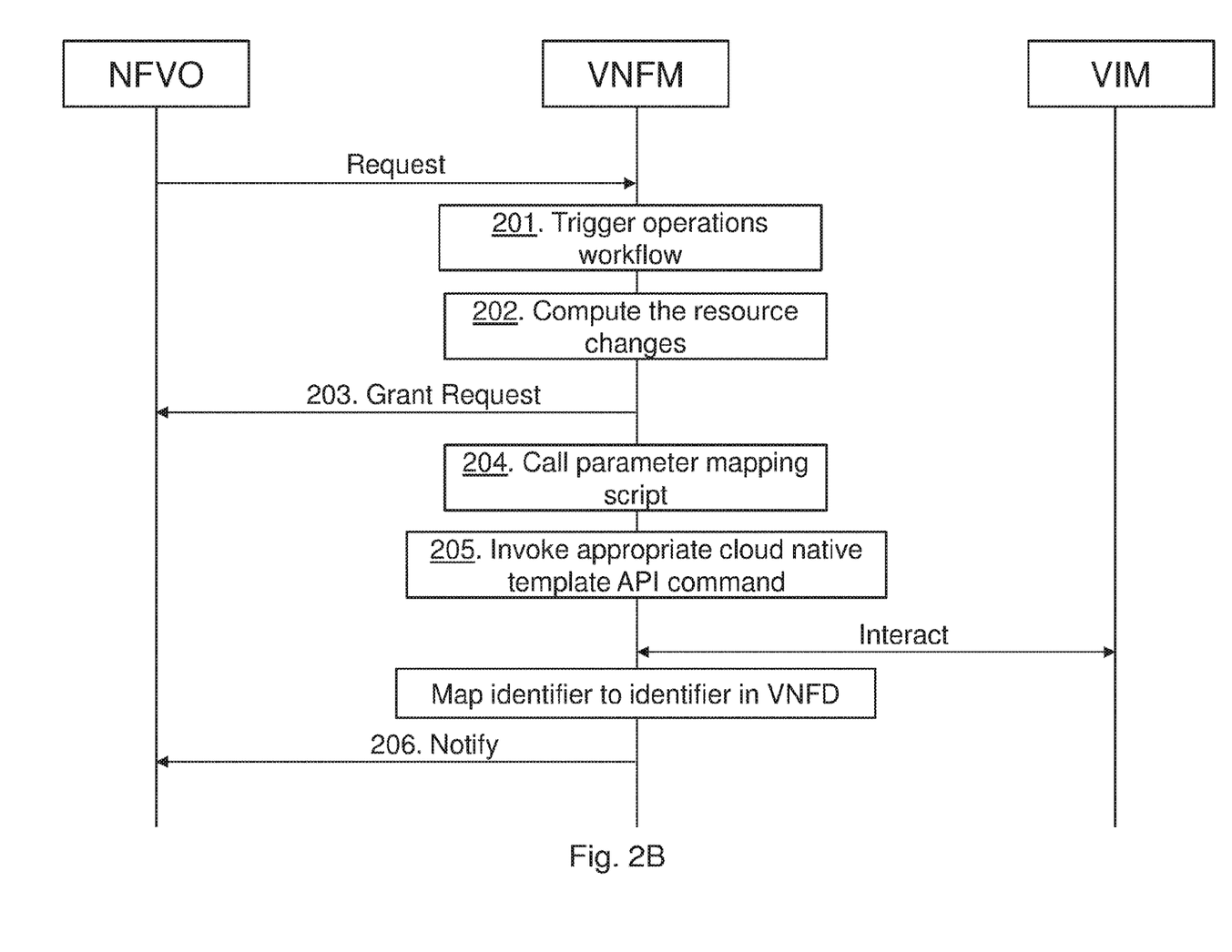
FIG. 2B is a flow sequence according to some embodiments herein.

The actions outlined below illustrate the basic principles on how e.g. the VNFM in accordance with an embodiment of this disclosure acts upon receiving, over Or-Vnfm from NFVO, different lifecycle management requests for a VNF: FIG. 2B:

201 The VNFM triggers the operations workflow in the VNFM for the particular operation request received request from the NFVO 202 If the request is for adding, changing or removing virtual resources
Compute the resource changes to be done 203 Send Grant request to NFVO if the operation use case requires so
Using info from previous step, and if response indicates granted then proceed with next action 204 VNFM calls a parameter mapping script, wherein the script fetched from VNF package
Input: information from the operation request received from NFVO, together with information from the Grant request and response—if granting was done.
The script will execute the mappings specified for the type of operation request received from the NFVO
Output: input parameter key-value pairs for the cloud native template specified inputs that need values specific to the operation in question 205 VNFM invokes the appropriate cloud native template API command.
Input: cloud native template input parameters calculated in the previous action 204, and depending on operation type then also providing the cloud native templates in the command 206 VNFM sends Notify to NFVO if the operations use case so requires
VNFM interacts with the VIM to get a list of the virtual resources deployed for the VNF
VNFM maps the cloud native resource identifiers to identifiers in VNFD. If the resource id's in the VNFD are derived from the resource names in the cloud native templates, then the mapping can in many cases be done through generic procedures built into the VNFM framework. Else a specific mapping script need to be provided in the VNF Package and fetched and invoked by the VNFM.
VNFM sends Notify to NFVO including the list of resources generated in the previous action 206.

Figure 2C:
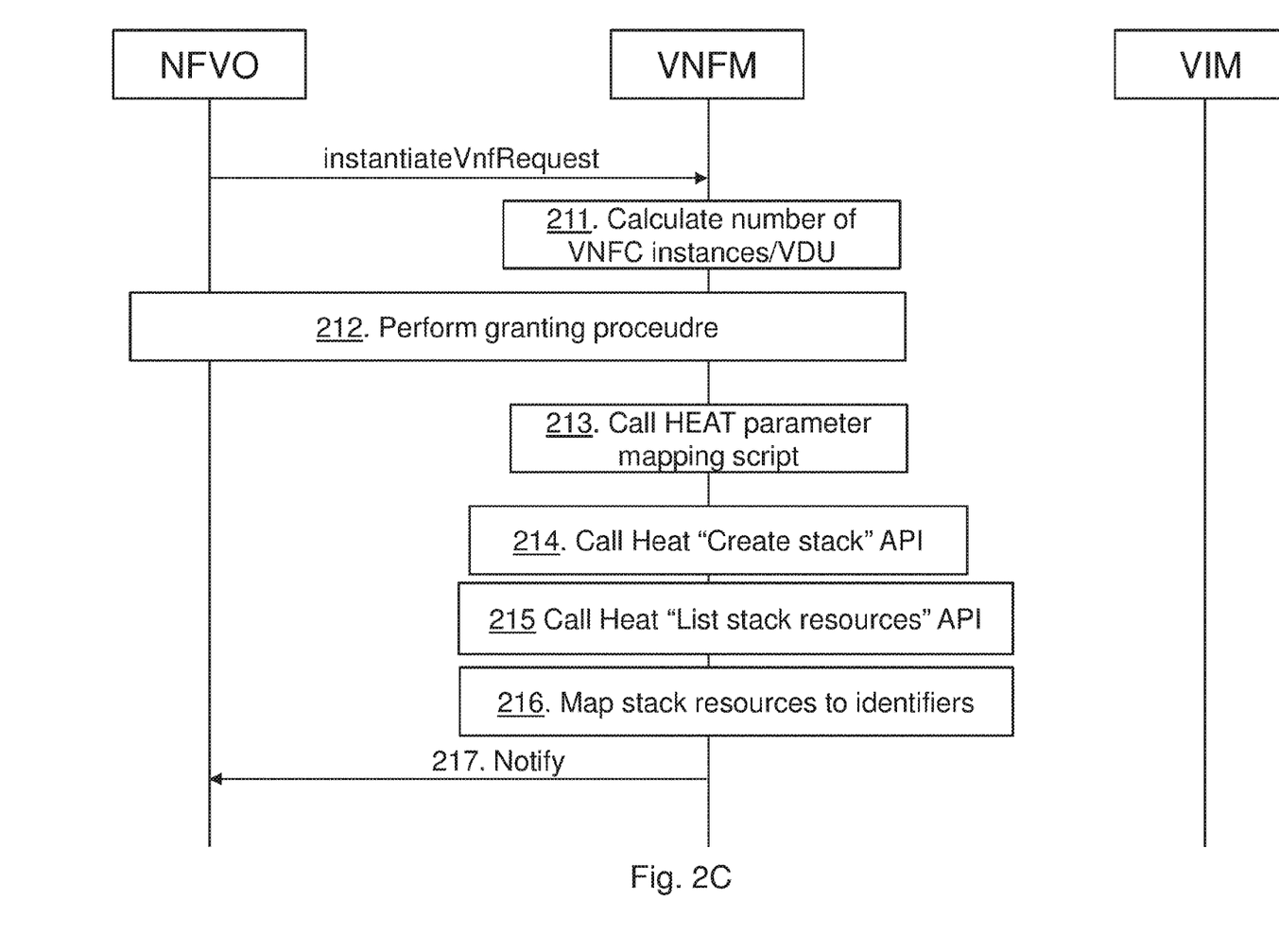
FIG. 2C is a flow sequence according to some embodiments herein.

Below is an example showing the handling of the instantiateVnfRequest for a VNF that shall be instantiated on Openstack, and the Cloud native templates therefore in this example are Openstack Heat orchestration templates (HOT). FIG. 2C:

On instantiate VNF operation request from NFVO:
211. VNFM calculates number of VNF component (VNFC) instances per Virtualization Deployment Unit (VDU)
Using instantiation Level Id received from NFVO combined with instantiation level definition in the TOSCA VNFD 212. VNFM performs granting procedure with NFVO
Using information from the previous action 211.

213. VNFM calls Heat parameter mapping script (from VNF package)
Input: information from the InstantiateVnfRequest, the Grant request sent to NFVO and the Grant reply. Information needed is for example deployment flavor Id, image Ids, network Ids, additionalParams, number of VNFC instances per VDU, etc.
Output: HOT input parameter key-value pairs 214. VNFM calls Heat "Create stack" API
Input: HOT from VNF package, and HOT parameters from the previous action 213.

215. VNFM calls Heat "List stack resources" API

216. VNFM maps stack resources to identifiers in VNFD, e.g. VM X→vduId Y

217. VNFM sends Notify to NFVO
Using the result from the previous action 216.

Figure 2D:
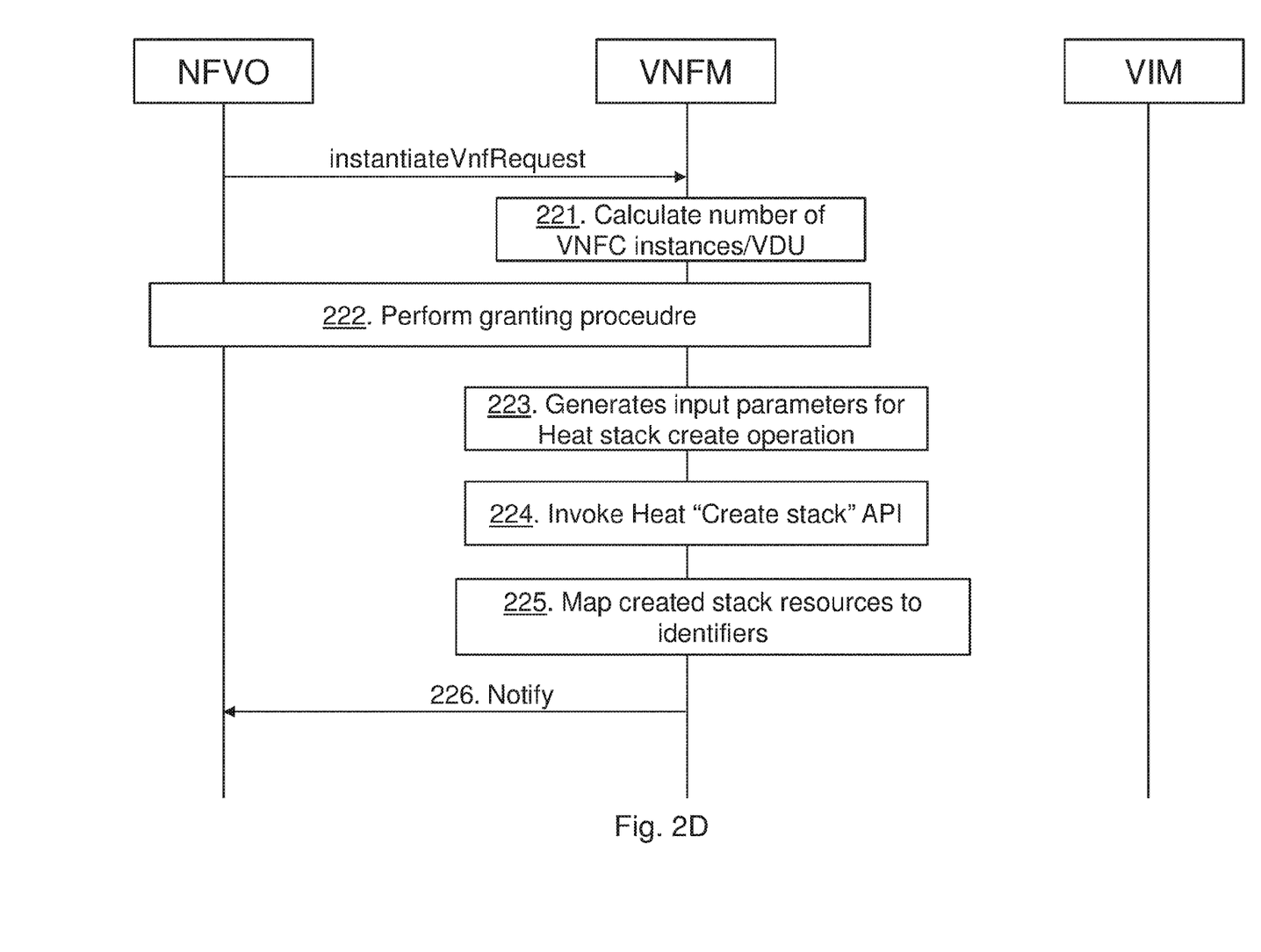
FIG. 2D is a flow sequence according to some embodiments herein.

FIG. 2D:
Below is shown a further exemplary process for handling the instantiateVnfRequest: (Actions 221. and 222. as in previous example above, i.e. actions 211 and 212)

223. VNFM generates input parameters for the Heat stack create operation (action 224) towards the VIM
This is done by the VNFM invoking the Heat parameter mapping script (from VNF package)
Note: Using a separate script to do the parameter mappings is herein disclosed.
Input: information from the communication messages the VNFM over Or-Vnfm reference point has received from and sent to NFVO. This includes for this particular Life Cycle Management (LCM) operation the InstantiateVnfRequest, the Grant request sent to NFVO and the Grant reply received. Information needed by the script is for example deployment flavor Id, image Ids, network Ids, additionalParams, number of VNFC instances per VDU, etc.
Output: HOT input parameter key-value pairs 224. VNFM invokes the Heat "Create stack" operation in the VIM API
Input: HOT from VNF package, and HOT parameters (key-value pairs) from previous action 225. VNFM maps the created stack resources to identifiers in VNFD (how this is done is herein disclosed)
VNFM invokes the Heat "List stack resources" operation in the VIM API and automatically maps the listed stack resources to identifiers in VNFD based on the resource id's in the VNFD being derived from the resource names, e.g. VM X→vduId Y.
Output: List of resources with VNFD based ID's Optionally a separate resource mapping script could be included in the VNF package for performing the resource id mappings, taking precedence over built in mapping procedures.

226. VNFM sends Notify to NFVO (MANO prescribed)
   Includes in the notify the result from the previous action

Figure 2E:
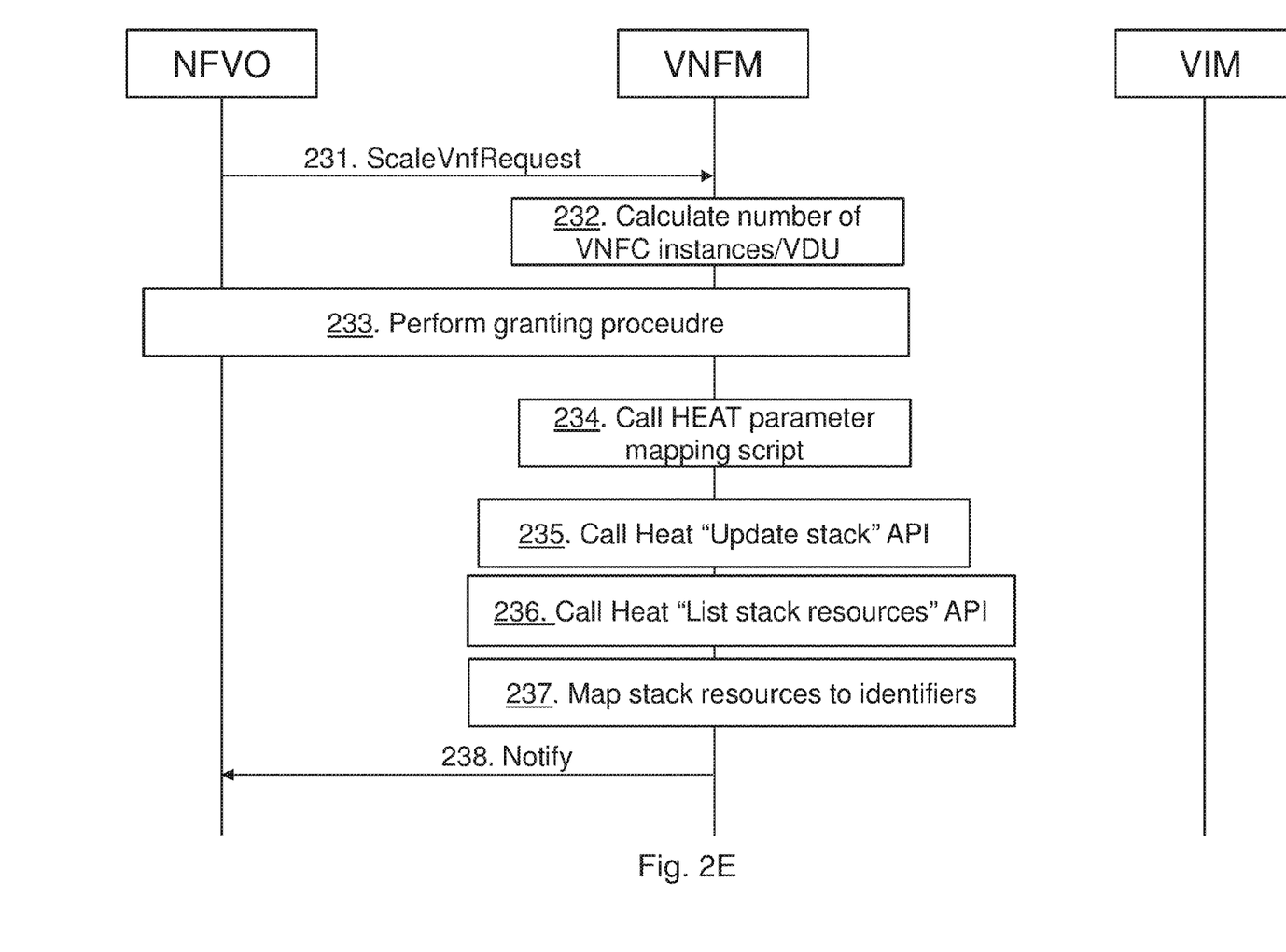
FIG. 2E is a system detail including the NFVO and VNFM.

FIG. 2E:

The following exemplary process shows the actions for performing a ScaleVnfRequest operation:

231. VNFM receives ScaleVnfRequest
232. VNFM calculates new number of VNFC instances per VDU
   Using new scale level(s) combined with scaling aspects definition in the TOSCA VNFD
233. VNFM performs granting procedure with NFVO
234. VNFM calls Heat parameter mapping script (from VNF package)
   Input: new number of VNFC instances per VDU, etc.
   Output: HOT parameters (key-value pairs)
      Specifically new value for the parameter that specifies the count of the HOT ResourceGroup
235. VNFM calls Heat "Update stack" API with 'existing'=true (don't update template)
   Input: HOT parameters from previous action
236. VNFM calls Heat "List stack resources" API
237. VNFM maps new stack resources to identifiers in VNFD, e.g. VM X→vduId Y
238. VNFM sends Notify to NFVO
   Using result from previous action (for added resources)

Figure 2F:
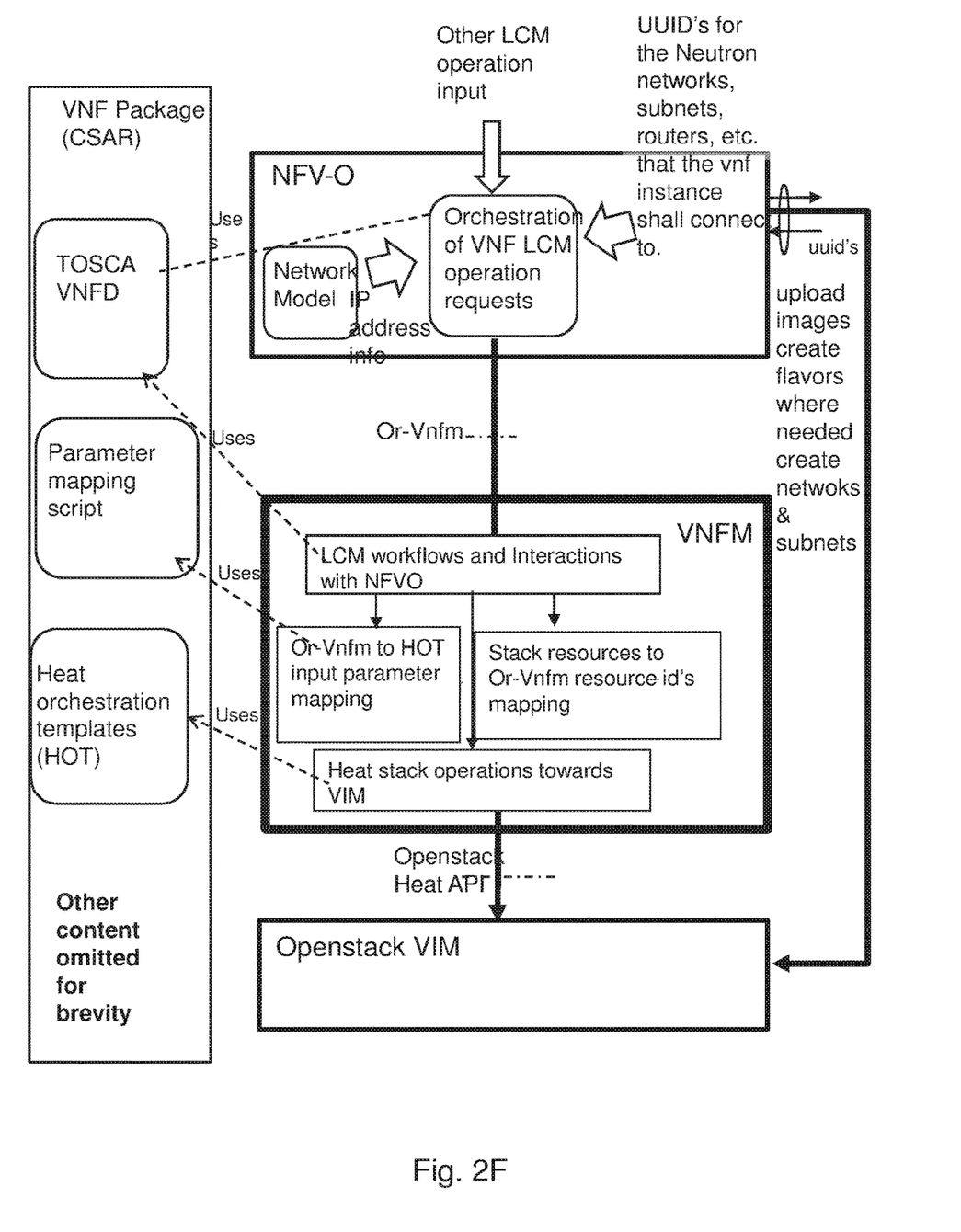
FIG. 2F shows an example of a VNF Orchestration architecture.

An exemplary VNF Orchestration architecture is shown in FIG. 2F. A VNF package contains, in addition to the TOSCA VNFD, also VNF specific Openstack Heat Orchestration Templates, together with a script that for the different LCM operations maps information from Or-Vnfm to input parameters for the Heat Orchestration Templates denoted as parameter mapping script.

The VNFD is used by both NFVO and VNFM and drives all interactions between them, as well as describes the lifecycle management operations, deployment flavors and instantiation level, and the VNF resource aspects that need instance specific resource granting.

The parameter mapping script outputs the second parameters such as Heat input parameter/value pairs, which together with the HOT is then used in the Heat stack commands that the VNFM uses for interaction with the Openstack VIM.

Parameter mapping considerations in accordance with some embodiments:
   The purpose is to map first parameters e.g. Or-Vnfm LCM operation parameters to second parameters e.g. HOT input parameters.
   Correct mapping may be required for SOL003 compliancy.
   The HOT input parameters needed to be assigned values are typically:
      OpenStack virtual resource parameters that are not statically defined in the VNFD, e.g. flavors, images, availability zones, networks to connect the VNF to, etc.
      VNF day-0 configuration parameters (typically conveyed to the VNF's VMs via cloudinit usedata)
   Note that parameter mapping are not only required for instantiate. Therefore the mapping script contains parameter mappings for all LCM operations specified in the VNFD.

Figure 3:
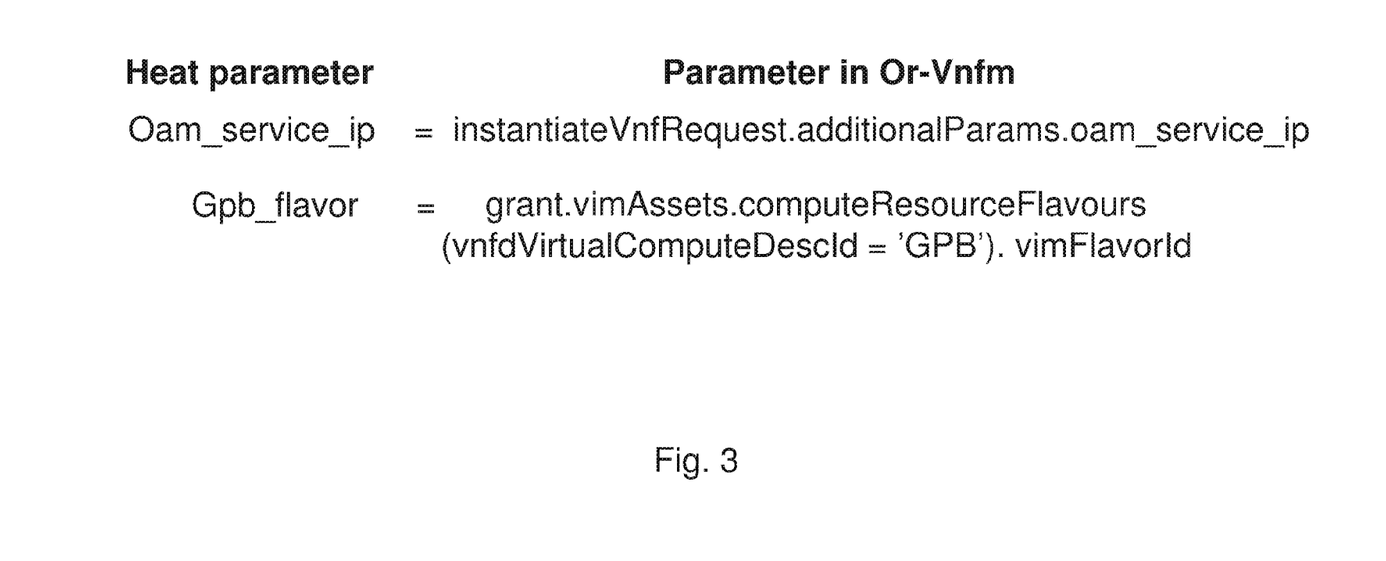
FIG. 3 is a simple pseudocode according some embodiments.

FIG. 3 shows a simple pseudo-code example to illustrate how the parameter mapping can be done.

Note: In the pseudo-code, [key=value] means finding an object in a list where key==value. This may be required because the SOL003 data types and vduInfo are constructed using lists and node yaml dicts/maps.

Resource mapping considerations in accordance with some embodiments:
   The purpose is to map VNF virtual resources deployed in OpenStack (in the VNF instance's Heat stack) to virtual resources conveyed over Or-Vnfm
   This may be required for "Query VNF response" and "Notify", as well as for a "Grant request" for resources to be removed or updated.
   Note: Information in Grant request, relating to resources to be added, may be derived solely from the TOSCA VNFD.
   Correct mapping is required for SOL001 and SOL003 compliancy
   Primarily the OpenStack resources may be mapped to identifiers defined in the TOSCA VNFD, e.g. vduId, cpdId, vnfVirtualLinkDescId. Secondarily they may be mapped to a certain instance, e.g. VNFC instance.
   Note: If the first parameter such as resource id's in the VNFD (vduId, etc.) are based on the second parameter such as resource id's (i.e. resource names) in the HOT template, then the mapping can be automated. An alternative is to include in the VNF package also a resource mapping script in addition to the parameter script.

Figure 4:
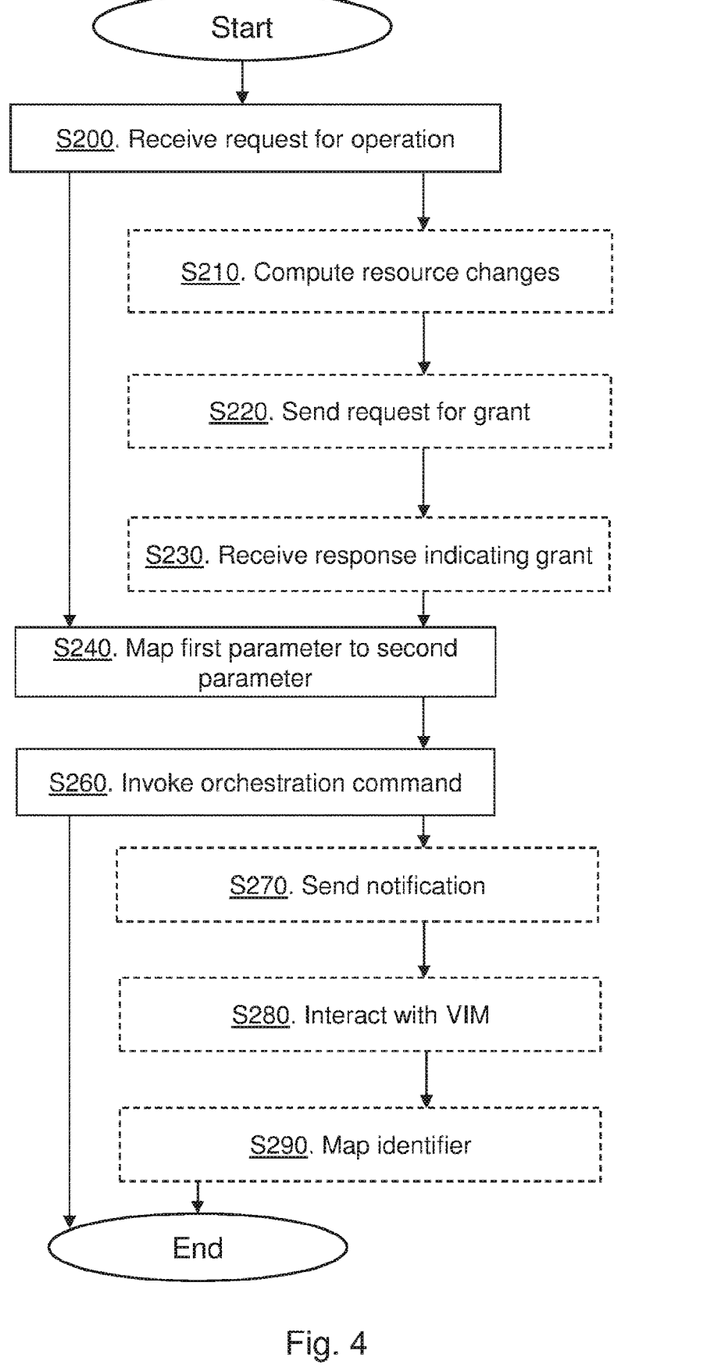
FIG. 4 is a schematic flowchart depicting a method performed by a node according to embodiments herein.

FIG. 4 shows a method performed in the node 15 such as a management node in accordance with an aspect of the proposed technology. Dashed lines indicate optional actions of the method for handling a management operation. The node may be a VNFM.

Action S200. The node 15 receives from the orchestration node, a request for an operation related to virtual network function operation. The request may relate to adding, changing or removing virtual resources. The orchestration node may be a NFV-O.

Action S210. The node 15 may compute resource changes to be performed. The request for grant includes information associated with the computed resource changes.

Action S220. The node 15 may send a request for grant to the orchestration node.

Action S230. The node 15 may receive a response indicating a grant to the sent request for grant.

Action S240. The node 15 maps a first parameter associated with the request to a second parameter related to a cloud native template. The node 15 may map the first parameter using a script mapping the first parameter to the second parameter, wherein mapping the first parameter comprises using a name correlation scheme, seeing to that the first parameter in a TOSCA VNFD is derived from the second parameter in the cloud native template. The first parameter may comprise information from the request and the second parameter may comprise input parameter key-value pairs for cloud native template specified inputs that need values specific to the management operation. The first parameter may comprise virtual resource parameters that are not statically defined in a VNFD e.g. flavors, images, availability zones, networks to connect the VNF to, etc. The script may be fetched from a VNF software package such as CSAR software package. The script may comprise the node calling the script. Input to the script may be at least one of information from the request received from the orchestration node, information from the request for grant, and information from the response to the request for grant. output from the script may comprise input parameter key-value pairs for the cloud native template. Input to the orchestration command may comprise at least one of cloud native orchestration template input parameters, and the cloud native template.

Action S260. The node invokes or provides an orchestration command comprising the mapped second parameter related to the cloud native template. The orchestration command may be a cloud native template orchestration API command. The cloud native orchestration template input parameters may comprise key-value pairs for a cloud native template.

Action S270. The node may send a notification to the orchestration node.

Action S280. The node may interact with a VIM to get a list of virtual resources deployed for the VNF. The notification may comprise the list of virtual resources. Thus, node may interact with the VIM to effectuate the orchestration operation Action S290. The node may further map at least one cloud native resource identifier to an identifier in a VNFD.

While processes in the figures may show a particular order of operations performed by certain embodiments of the present disclosure, it should be understood that such order is exemplary, e.g., alternative embodiments may perform the operations in a different order, combine certain operations, overlap certain operations, etc.

Figure 5:
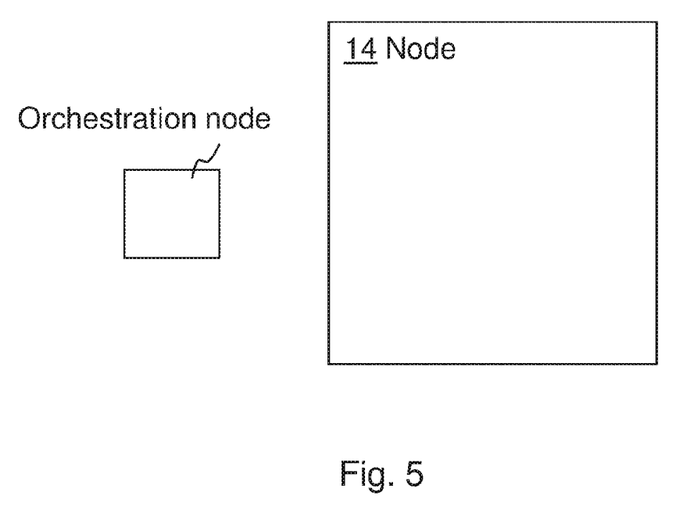
FIG. 5 is a block diagram depicting a node according to embodiments herein.

FIG. 5 is a block diagram depicting the node 15 for handling a management operation.

The node 15 is adapted to receive from the orchestration node, the request for an operation related to virtual network function operation.

The node 15 is further adapted to map the first parameter associated with the request to the second parameter related to the cloud native template. The node is further adapted to invoke the orchestration command comprising the mapped second parameter related to the cloud native template.

The node 15 may be adapted to map the first parameter by using the script mapping the first parameter to the second parameter.

The script may be fetched from the VNF software package.

The script may comprise the node calling the script.

The input to the script may be at least one of information from the request received from the orchestration node, information from the request for grant, and information from the response to the request for grant.

The output from the script may comprise input parameter key-value pairs for the cloud native template.

The node 15 may be adapted to map the first parameter by using the name correlation scheme, seeing to that the first parameter in the VNFD is derived from the second parameter in the cloud native template.

The first parameter may comprise information from the request, and the second parameter may comprise input parameter key-value pairs for cloud native template specified inputs that need values specific to the management operation.

The first parameter may comprise virtual resource parameters that are not statically defined in a VNFD.

The node 15 may further be adapted to compute resource changes to be performed.

The request may relate to adding, changing or removing virtual resources.

The node 15 may further be adapted to send the request for grant to the orchestration node.

The request for grant may include information associated with the computed resource changes.

The node 15 may further be adapted to receive the response indicating the grant to the sent request for grant.

The orchestration command may be a cloud native template orchestration API command.

The node 15 may be a VNFM.

The orchestration node may be a NFV-O.

The input to the orchestration command, towards the VIM, may comprise at least one of cloud native orchestration template input parameters, and the cloud native template.

The cloud native orchestration template input parameters may comprise key-value pairs for the cloud native template.

The node 15 may further be adapted to send a notification to the orchestration node.

The node 15 may further be adapted to interact with a VIM, to get a list of virtual resources deployed for a VNF.

The notification may comprise the list of virtual resources.

The node 15 may further be adapted to map at least one cloud native resource identifier to an identifier in a VNFD.

Further embodiments that are disclosed herein:
1. A method for handling a lifecycle management operation, the method comprising at a management node:
   receiving (S200) a request for an operation from an orchestration node;
   initiating (S240) a script for mapping of at least one parameter; and
   invoking (S260) an orchestration command.
2. The method of embodiments 1, further comprising comprises computing (S210) resource changes to be performed.
3. The method of embodiment 2, wherein the request relates to adding, changing or removing virtual resources.
4. The method of any one of embodiments 1 to 3, further comprising sending (S220) a request for grant to the orchestration node.
5. The method of embodiment 4, wherein the request for grant includes information associated with the computed (S210) resource changes.
6. The method any one of embodiments 4 to 5, further comprising receiving (S230) a response indicating a grant to the sent (S220) request for grant.
7. The method of any one of embodiments 1 to 6, wherein the script is fetched from a Virtual Network Function, VNF, software package.
8. The method of any one of embodiments 1 to 7, wherein the orchestration command is a cloud native template orchestration Application Programming Interface, API, command.
9. The method of any one of embodiments 1 to 8, wherein the management node is a Virtualized Network Function Manager, VNFM.
10. The method of any one of embodiments 1 to 9, wherein the orchestration node is a Network Function Virtualization Orchestrator, NFV-O.
11. The method of any one of embodiments 1 to 10, wherein the initiating (S240) a script comprises the management node calling the script.
12. The method of any one of embodiments 1 to 11, wherein input to the script is at least one of information from the request received from the orchestration node, information from the request for grant, and information from the response to the request for grant.

13. The method of any one of embodiments 1 to 12, wherein output from the script comprises input parameter key-value pairs for the cloud native template.
14. The method of any one of embodiments 1 to 13, wherein input to the orchestration command comprises at least one of cloud native orchestration template input parameters, and the cloud native template.
15. The method of embodiment 14, wherein cloud native orchestration template input parameters comprises key-value pairs for the cloud native template.
16. The method of any one of embodiments 1 to 15, further comprising: sending (S270) a notification to the orchestration node.
17. The method of any one of embodiments 1 to 18, further comprising: interacting (S280) with a Virtualization Infrastructure Manager, VIM, to get a list of virtual resources deployed for the VNF.
18. The method of embodiment 17, wherein the notification comprises the list of virtual resources.
19. The method of any one of embodiments 1 to 18, further comprising: mapping (S290) at least one cloud native resource identifier to an identifier in a Virtualized Network Function Descriptor, VNFD.
20. A node method for handling a lifecycle management operation, the node adapted to:
receive a request for an operation from an orchestration node;
initiate a script for mapping of at least one parameter; and
invoke an orchestration command.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a node for handling a management operation, the method comprising:
receiving, from an orchestration node, a Life Cycle Management (LCM) request comprising a first parameter that is supported by the orchestration node and is incompatible with an operation provided by a cloud native deployment template;
translating the first parameter received in the LCM request to a second parameter that is compatible with the operation provided by the cloud native deployment template; and
using the second parameter that is compatible with the operation to invoke the operation provided by the cloud native deployment template.

2. The method of claim 1, further comprising:
fetching a script from a Virtual Network Function (VNF) software package; and
using the script to translate the first parameter to the second parameter.

3. The method of claim 2, wherein the script comprises the node calling the script.

4. The method of claim 2, wherein input to the script is at least one of information from the LCM request received from the orchestration node, information from a request for grant, and information from a response to the request for grant.

5. The method of claim 2, wherein output from the script comprises input parameter key-value pairs for the cloud native deployment template.

6. The method of claim 2, wherein using the script to translate the first parameter to the second parameter comprises using a name correlation scheme to derive a Topology and Orchestration Specification for Cloud Applications (TOSCA) Virtualized Network Function Descriptor (VNFD) resource name from a corresponding resource name in the cloud native deployment template.

7. The method of claim 1, wherein the second parameter comprises input parameter key-value pairs for cloud native template specified inputs that need values specific to the operation.

8. The method of claim 1, wherein the first parameter comprises virtual resource parameters that are not statically defined in a VNFD.

9. The method of claim 1, wherein the LCM request relates to adding, changing, or removing virtual resources.

10. The method of claim 1, further comprising:
sending a request for grant to the orchestration node; and
receiving a response indicating a grant to the sent request for grant.

11. The method of claim 10, further comprising computing resource changes to be performed, wherein the request for grant includes information associated with the computed resource changes.

12. The method of claim 1, wherein using the second parameter to invoke the operation comprises using the second parameter to invoke a cloud native template orchestration Application Programming Interface (API) command.

13. The method of claim 1, wherein the node is a Virtualized Network Function Manager (VNFM).

14. The method of claim 1, wherein the orchestration node is a Network Function Virtualization Orchestrator (NFV-O).

15. The method of claim 1, wherein using the second parameter to invoke the operation comprises using the second parameter as input to the cloud native deployment template.

16. The method of claim 15, wherein using the second parameter as input to the cloud native deployment template comprises using a key-value pair as input to the cloud native deployment template.

17. The method of claim 1, further comprising sending a notification to the orchestration node, wherein the notification comprises the list of virtual resources.

18. The method of claim 1, further comprising interacting with a Virtualization Infrastructure Manager (VIM) to get a list of virtual resources deployed for a VNF.

19. The method of claim 1, further comprising mapping at least one cloud native resource identifier to an identifier in a VNFD.

20. A node for handling a management operation, wherein the node is adapted to:
receive, from an orchestration node, a Life Cycle Management (LCM) request comprising a first parameter that is supported by the orchestration node and incompatible with an operation provided by a cloud native deployment template;
translating the first parameter received in the LCM request to a second parameter that is compatible with the operation provided by the cloud native deployment template; and
use the second parameter that is compatible with the operation to invoke the operation provided by the cloud native deployment template.

21. The node of claim 20, wherein the node is further adapted to:
fetch a script from a Virtual Network Function (VNF) software package; and use the script to translate the first parameter to the second parameter.

22. The node of claim 21, wherein the script comprises the node calling the script.

23. The node of claim 21, wherein input to the script is at least one of information from the LCM request received from the orchestration node, information from a request for grant, and information from a response to the request for grant.

* * * * *